(12) United States Patent
Zolla et al.

(10) Patent No.: US 12,597,437 B2
(45) Date of Patent: Apr. 7, 2026

(54) REAR SOFT BIAS DUAL FREE LAYER SENSOR WITH PATTERNED DECOUPLING LAYER

(71) Applicant: Western Digital Technologies, Inc., San Jose, CA (US)

(72) Inventors: Howard Gordon Zolla, Los Gatos, CA (US); Yongchul Ahn, San Jose, CA (US); Rong Cao, Pleasanton, CA (US); Goncalo Baião De Albuquerque, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 112 days.

(21) Appl. No.: 18/496,203

(22) Filed: Oct. 27, 2023

(65) Prior Publication Data

US 2025/0140285 A1 May 1, 2025

(51) Int. Cl.
*G11B 5/39* (2006.01)

(52) U.S. Cl.
CPC .......... *G11B 5/3909* (2013.01); *G11B 5/3912* (2013.01); *G11B 5/3932* (2013.01); *G11B 5/3954* (2013.01)

(58) Field of Classification Search
None
See application file for complete search history.

(56) References Cited

U.S. PATENT DOCUMENTS

| | | | |
|---|---|---|---|
| 7,005,242 B2 | 2/2006 | Jayasekara | |
| 7,199,986 B2 | 4/2007 | Cyrille et al. | |
| 8,037,593 B2 | 10/2011 | Ho et al. | |
| 8,553,371 B2 | 10/2013 | Zhu et al. | |
| 9,076,468 B1 * | 7/2015 | Keener et al. | ....... G11B 5/3932 |
| 9,147,404 B1 * | 9/2015 | Luo et al. | ............. G11B 5/398 |
| 9,280,992 B1 | 3/2016 | Jiang et al. | |
| 9,384,763 B1 | 7/2016 | Liu et al. | |
| 9,406,320 B2 * | 8/2016 | Le et al. | ............. G11B 5/3932 |
| 9,449,621 B1 * | 9/2016 | Mauri et al. | ........... G11B 5/398 |
| 9,472,215 B1 * | 10/2016 | Jiang et al. | .......... G11B 5/3912 |
| 9,508,365 B1 | 11/2016 | Zheng et al. | |
| 10,614,838 B2 * | 4/2020 | Sapozhnikov et al. | ...................... G11B 5/3932 |

(Continued)

OTHER PUBLICATIONS

X. Liu et al., "Dual Free Layer Reader for Future Recording Head," 2022 IEEE 33rd Magnetic Recording Conference (TMRC), Milpitas, CA, USA, 2022.

*Primary Examiner* — Craig A. Renner
(74) *Attorney, Agent, or Firm* — Patterson + Sheridan, LLP

(57) ABSTRACT

Rather than disposing a cap layer on a rear soft bias (RSB) of a DFL read head prior to the patterning of the RSB and TMR sensor, disclosed is a decoupling layer disposed on the RSB and TMR sensor after they undergo patterning, with the decoupling layer undergoing its own subsequent patterning. The RSB and the TMR sensor can thus be patterned (defined) together without a RSB cap layer adversely affecting the patterning. As the decoupling layer undergoes its separate patterning, its cross-track width can be flexibly optimized to be greater than that of both the RSB and the TMR sensor. In some embodiments, the decoupling layer's extra width will help it completely decouple the RSB and TMR sensor from the top shield. The side shields will be partially decoupled from the top shield due to the extra width, but will still retain partial coupling to the top shield.

20 Claims, 6 Drawing Sheets

(56) References Cited

U.S. PATENT DOCUMENTS

| 10,777,222 | B1 * | 9/2020 | Liu et al. | ............. | G11B 5/3912 |
| 11,024,333 | B2 | 6/2021 | Wu | | |
| 11,170,807 | B1 * | 11/2021 | Liu et al. | ............. | G11B 5/3932 |
| 11,380,355 | B2 * | 7/2022 | Garfunkel et al. | .. | G11B 5/3912 |
| 11,393,494 | B2 | 7/2022 | Sapozhnikov et al. | | |
| 11,514,935 | B1 * | 11/2022 | Liu et al. | ............. | G11B 5/3932 |
| 12,106,787 | B1 * | 10/2024 | Wang et al. | ......... | G11B 5/3932 |
| 2011/0026169 | A1 * | 2/2011 | Gill et al. | ............. | G11B 5/3929 |
| | | | | | 360/324.12 |
| 2016/0163338 | A1 * | 6/2016 | Ho et al. | ............. | G11B 5/3909 |
| | | | | | 360/75 |
| 2021/0390978 | A1 * | 12/2021 | Hu et al. | ............. | G11B 5/3932 |
| 2024/0071413 | A1 * | 2/2024 | Mao et al. | ............. | G11B 5/398 |

* cited by examiner

Second shield (S2) 322

Decoupling Layer 312

Upper SB 320b

Spacer 318b

Lower SB 316b

Insulation Layer 314b

Upper SB 320a

Spacer 318a

Lower SB 316a

Insulation Layer 314a

RSB 346

Seed Layer 344

Seed Layer 304

First shield (S1) 302

300

300

REAR SOFT BIAS DUAL FREE LAYER SENSOR WITH PATTERNED DECOUPLING LAYER

BACKGROUND OF THE DISCLOSURE

Field of the Disclosure

Embodiments of the present disclosure generally relate to a dual free layer (DFL) read head.

Description of the Related Art

Read heads, which are configured to read data from a media, generally rely on a magnetic free layer's rotation in the presence of magnetic fields from the media to generate a read signal. While a single free layer reader includes one free layer, a dual free layer (DFL) reader comprises two free layers. In DFL reader operation, the two free layers are within a tunnel magneto resistance (TMR) sensor stack and are individually stabilized longitudinally by an anti-ferromagnetically coupled (AFC) soft bias (SB) that are part of the reader's side shields.

The two free layers in DFL may also be transversely biased by a rear soft bias (RSB), a transverse biasing layer positioned behind (in the back of) the TMR sensor. The RSB is stabilized by shape anisotropy which arises from its long, slender and needle-like shape. The RSB also ideally should be of comparable width in the cross-track direction as the TMR sensor and be positioned directly therebehind. Typically, the RSB is patterned at the same time as the TMR sensor in the cross-track direction for manufacturing efficiency.

In order for the RSB to function properly, the RSB is magnetically decoupled from a shield formed thereabove. Typically, a cap layer is in place between the RSB and the shield to decouple the RSB from the shield. The cap is formed prior to patterning the RSB and is therefore patterned at the same time as both the RSB and the TMR sensor in the cross-track direction. The cap impedes the patterning process that defines the shape of the RSB. More specifically, the cap leads to inadequate removal of RSB material during patterning such that the RSB width does not substantially equal the TMR sensor width, especially at its base.

An example material for the RSB may comprise $Ni_{80}Fe_{20}$, which may not always provide sufficient bias to the TMR sensor and thus have inadequate performance. When there is a need for more bias, alloys such as $Ni_{45}Fe_{55}$, CoFe, and other materials are utilized, but such other materials are hard to pattern and thus exacerbate the issues that the cap already causes.

Therefore, there is a need in the art for an improved DFL read head.

SUMMARY OF THE DISCLOSURE

Rather than disposing a cap layer on a rear soft bias (RSB) of a DFL read head prior to the patterning of the RSB and TMR sensor, disclosed is a decoupling layer disposed on the RSB and TMR sensor after they undergo patterning, with the decoupling layer undergoing its own subsequent patterning. The RSB and the TMR sensor can thus be patterned (defined) together without a RSB cap layer adversely affecting the patterning. As the decoupling layer undergoes its separate patterning, its cross-track width can be flexibly optimized to be greater than that of both the RSB and the TMR sensor. In some embodiments, the decoupling layer's extra width will help it completely decouple the RSB and TMR sensor from the top shield. The side shields will be partially decoupled from the top shield due to the extra width, but will still retain partial coupling to the top shield.

In one embodiment, a DFL read head comprises: dual free layer (DFL) read head, comprising: a first shield; a tunnel magneto resistance (TMR) sensor disposed at a media facing surface (MFS) and over the first shield; soft bias (SB) side shields disposed adjacent to the TMR sensor, in a cross-track direction and at the MFS, and over the first shield; a rear soft bias (RSB) disposed adjacent to the TMR sensor in a stripe height direction, and recessed from the MFS and over the first shield; a decoupling layer disposed on the TMR sensor, the RSB, and at least a portion of the SB side shields; and a second shield disposed over the decoupling layer and the SB side shields, wherein both the decoupling layer and the SB shields are in contact with the second shield.

In another embodiment, a dual free layer (DFL) read head comprises: a tunnel magneto resistance (TMR) sensor disposed at a media facing surface (MFS), wherein the TMR sensor has a first cross-track direction width at the MFS; soft bias (SB) side shields disposed adjacent to the TMR sensor at the MFS; a rear soft bias (RSB) disposed adjacent to the TMR sensor and recessed from the MFS; and a decoupling layer disposed on the TMR sensor, wherein the decoupling layer has a second cross-track direction width at the MFS, wherein the second cross-track direction width is greater than the first cross-track direction width.

In another embodiment, a dual free layer (DFL) read head comprises: a tunnel magneto resistance (TMR) sensor disposed at a media facing surface (MFS); soft bias (SB) side shields disposed adjacent to the TMR sensor in a cross-track direction at the MFS; a rear soft bias (RSB) disposed adjacent to the TMR sensor in a stripe height direction and recessed from the MFS, wherein the RSB has a first width in the cross-track direction; and a decoupling layer disposed on the RSB, wherein the decoupling layer has a second width in the cross-track direction at the MFS, wherein the second width is greater than the first width.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Rather than disposing a cap layer on a rear soft bias (RSB) of a DFL read head prior to the patterning of the RSB and TMR sensor, disclosed is a decoupling layer disposed on the RSB and TMR sensor after they undergo patterning, with the decoupling layer undergoing its own subsequent patterning. The RSB and the TMR sensor can thus be patterned (defined) together without a RSB cap layer adversely affecting the patterning. As the decoupling layer undergoes its separate patterning, its cross-track width can be flexibly optimized to be greater than that of both the RSB and the TMR sensor. In some embodiments, the decoupling layer's extra width will help it completely decouple the RSB and TMR sensor from the top shield. The side shields will be partially decoupled from the top shield due to the extra width, but will still retain partial coupling to the top shield.

Figure 1:
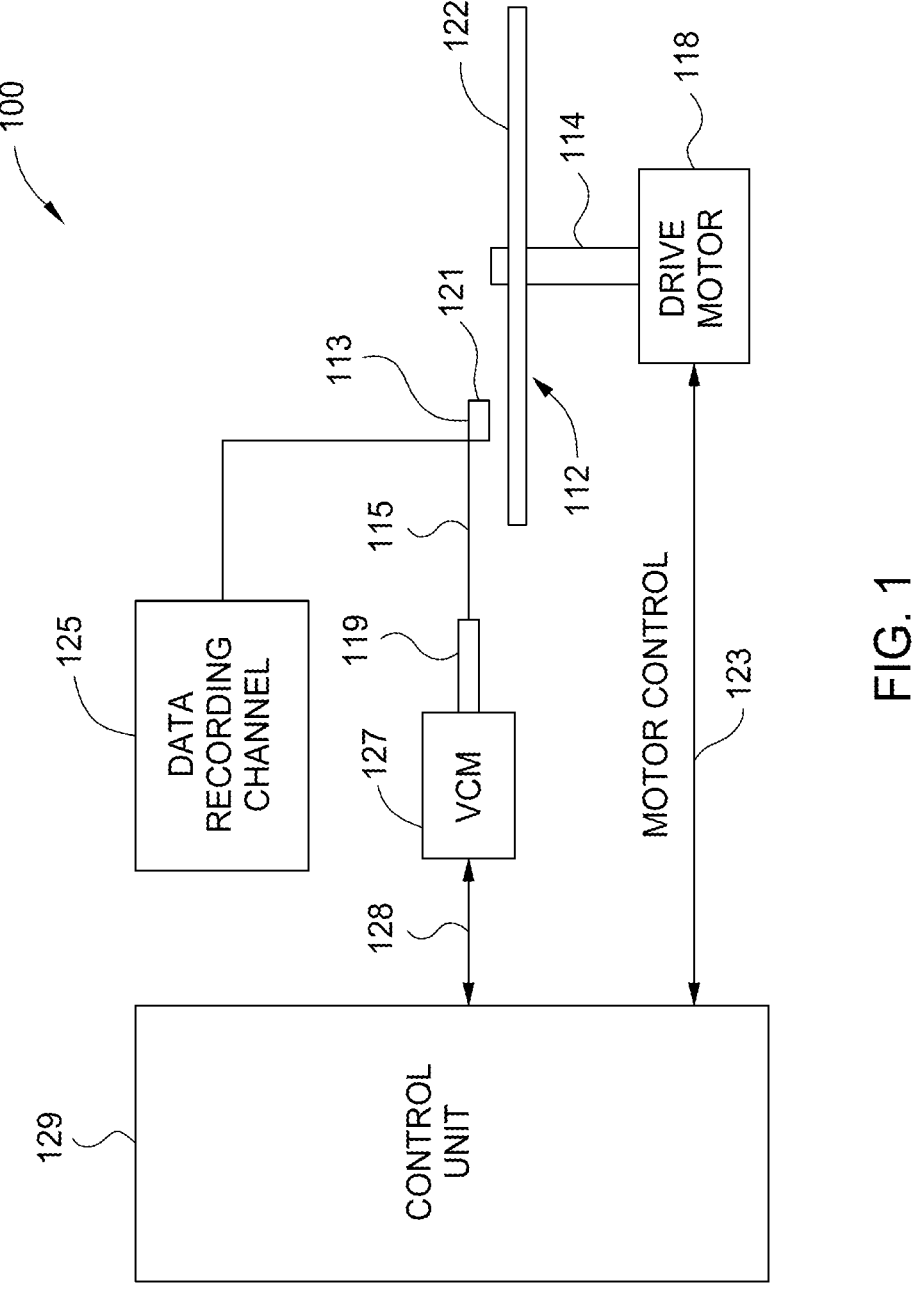
FIG. 1 illustrates a disk drive embodying this disclosure.

FIG. 1 is a schematic illustration of a magnetic recording device 100, according to one implementation. The magnetic recording device 100 includes a magnetic recording head, such as a read/write head. The magnetic recording device 100 is a magnetic media drive, such as a hard disk drive (HDD). Such magnetic media drives may be a single drive/device or include multiple drives/devices. For the ease of illustration, a single disk drive is shown as the magnetic recording device 100 in the implementation illustrated in FIG. 1. The magnetic recording device 100 (e.g., a disk drive) includes at least one rotatable magnetic disk 112 supported on a spindle 114 and rotated by a drive motor 118. The magnetic recording on each rotatable magnetic disk 112 is in the form of any suitable patterns of data tracks, such as annular patterns of concentric data tracks on the rotatable magnetic disk 112.

At least one slider 113 is positioned near the rotatable magnetic disk 112. Each slider 113 supports a head assembly 121. The head assembly 121 includes one or more magnetic recording heads, such as a write head and/or read head. As the rotatable magnetic disk 112 rotates, the slider 113 moves across the disk surface 122 so that the head assembly 121 may access different tracks of the rotatable magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by a control unit 129. Although not shown, the present disclosure may also be incorporated into a drive with a plurality of VCMs or actuators.

The head assembly 121, such as a write head of the head assembly 121, includes a media facing surface (MFS) such as an air bearing surface (ABS) that faces the disk surface 122. During operation of the magnetic recording device 100, the rotation of the rotatable magnetic disk 112 generates an air or gas bearing between the slider 113 and the disk surface 122 which exerts an upward force or lift on the slider 113. The air or gas bearing thus counter-balances the slight spring force of suspension 115 and supports the slider 113 off and slightly above the disk surface 122 by a small, substantially constant spacing during operation. In another embodiment, a negative pressure air bearing arrangement (not shown) may be utilized.

The various components of the magnetic recording device 100 are controlled in operation by control signals generated by control unit 129, such as access control signals and internal clock signals. The control unit 129 includes logic control circuits, storage means and a microprocessor. The control unit 129 generates control signals to control various system operations such as drive motor control signals on a line 123 and head position and seek control signals on a line 128. The control signals on line 128 provide the desired current profiles to optimally move and position slider 113 to the desired data track on rotatable magnetic disk 112. Write and read signals are communicated to and from the head assembly 121 by way of recording channel 125. In one embodiment, which can be combined with other embodiments, the magnetic recording device 100 may further include a plurality of media, or disks, a plurality of actuators, and/or a plurality number of sliders.

Figure 2:
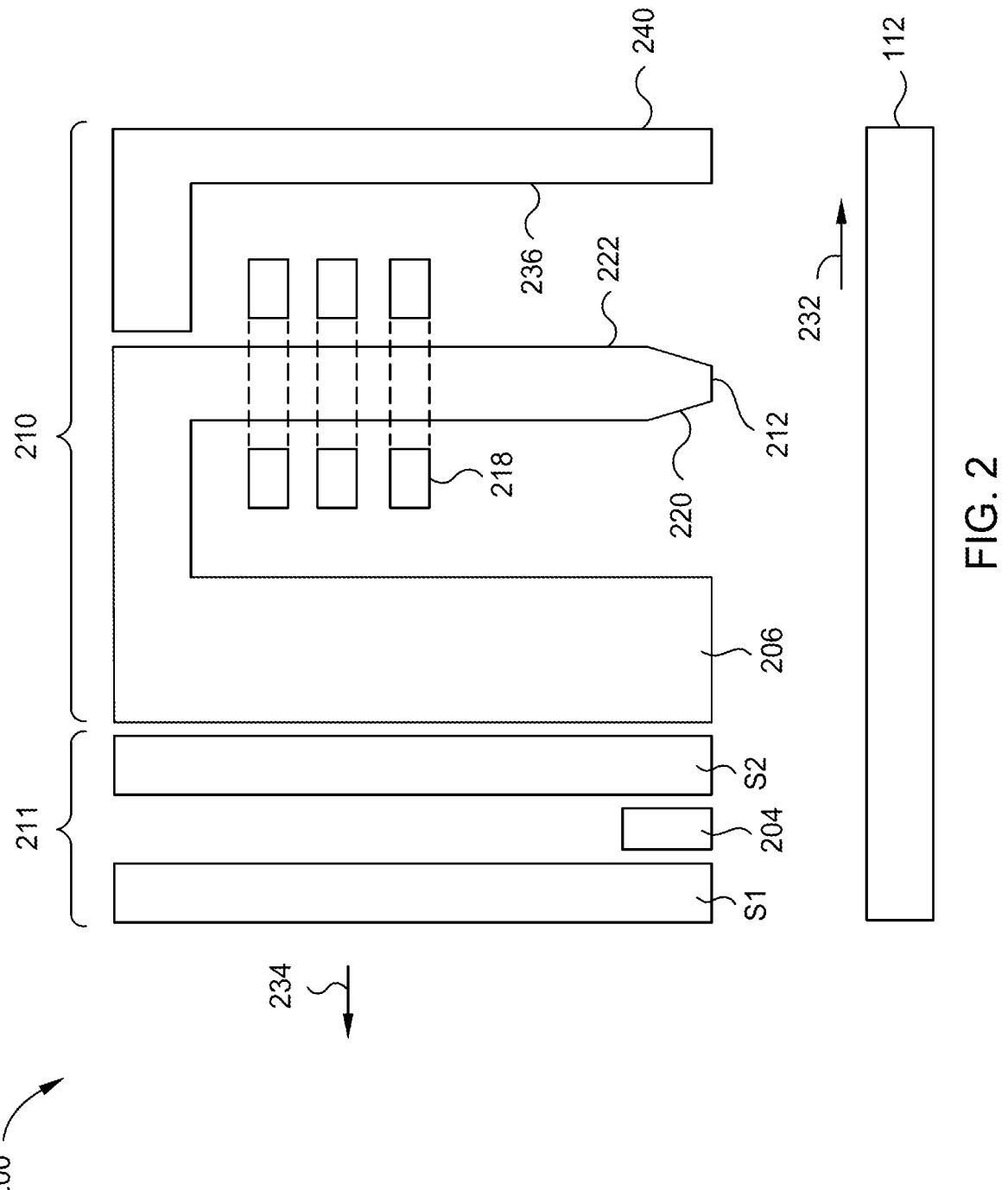
FIG. 2 is a fragmented, cross-sectional side view through the center of a read/write head facing a magnetic media, according to one embodiment.

FIG. 2 is a fragmented, cross sectional side view through the center of a read/write head 200 facing the magnetic media 112, according to one embodiment. In other embodiments, a different read/write head configuration may be utilized. The read/write head 200 may correspond to the magnetic head assembly 121 described in FIG. 1. The read/write head 200 includes a MFS 212, such as an ABS, a magnetic write head 210, and a magnetic read head 211, and is mounted such that the MFS 212 is facing the magnetic media 112. The read/write head 200 may be an energy-assisted magnetic recording (EAMR) head or a perpendicular magnetic recording (PMR) head. In FIG. 2, the magnetic media 112 moves past the write head 210 in the direction indicated by the arrow 232 and the read/write head 200 moves in the direction indicated by the arrow 234.

In some embodiments, the magnetic read head 211 is a SOT-based reader 204 located between the shields S1 and S2. In other embodiments, the magnetic read head 211 is a magnetoresistive (MR) read head that includes an MR sensing element 204 located between MR shields S1 and S2. In some other embodiments, the magnetic read head 211 is a magnetic tunnel junction (MTJ) read head that includes a MTJ sensing element 204 located between MR shields S1 and S2. The magnetic fields of the adjacent magnetized regions in the magnetic media 112 are detectable by the MR (or MTJ) sensing element 204 as the recorded bits.

The write head 210 includes a return pole 206, a main pole 220, a trailing shield 240, and a coil 218 that excites the main pole 220. The coil 218 may have a "pancake" structure which winds around a back-contact between the main pole 220 and the return pole 206, instead of a "helical" structure shown in FIG. 2. A trailing gap and a leading gap may be in contact with the main pole and a leading shield may be in contact with the leading gap. A recording magnetic field is generated from the main pole 220 and the trailing shield 240 helps making the magnetic field gradient of the main pole 220 steep. The main pole 220 may be a magnetic material such as a FeCo alloy. The main pole 220 may include a trailing surface 222 which may be parallel to a leading surface 236 of the trailing shield 240. The main pole 220 may be a tapered write pole (TWP) with a trailing edge taper (TET) configuration. In one embodiment, the main pole 220 has a saturated magnetization (Ms) of 2.4 T and a thickness of about 300 nanometers (nm). The main pole 220 may comprise ferromagnetic materials, typically alloys of one or more of Co, Fe, and Ni. The trailing shield 240 may be a magnetic material such as NiFe alloy. In one embodiment, the trailing shield 240 has an Ms of about 1.2 T to about 1.6 T.

Addressing the shortcomings of the RSB capping layer approach mentioned above, some embodiments propose an approach to fabricating dual free layer (DFL) read heads, which is to pattern a RSB structure and a TMR sensor element at the same time, without applying a capping layer to the RSB structure prior to patterning. After the TMR sensor element and RSB structure are defined, a decoupling layer can then be blanket applied to the entire element structure such that the RSB structure, TMR sensor element, and side shields are all covered. The approach is beneficial in that there is no capping layer to remove during the patterning process (the capping layer being a layer that is very hard to pattern). The approach is also beneficial because there is excellent decoupling between the RSB structure and a subsequently deposited shield, oftentimes referred to as S2, laminated shared shield (LSS) or laminated shield 2 (LS2), or the aforementioned top shield or S2 in FIG. 2.

However, the blanket deposition results in a blanket decoupling layer that fully decouples both the RSB structure and the side shields from S2. Because the side shields are not coupled to S2, the side shields are not stabilized by LS2. Additionally, the side shields, which are typically synthetic antiferromagnetic (SAF) in a DFL read head, need to have a preferred magnetic orientation. For a blanket deposited decoupling layer having full decoupling of both the side shield SAF and RSB from S2, the shape anisotropy of the side shield SAF would be near zero, providing inconsistent and varying bias direction.

In certain embodiments, a different decoupling layer process is proposed, resulting in a DFL read head where the RSB is decoupled from S2, but the side shield SAF is not fully decoupled from S2 while ensuring the RSB and TMR are easily defined/patterned. Such a structure has no cap or hard to mill/etch/remove layer in place at the time the RSB and TMR are patterned. Such a structure also has excellent decoupling between the RSB and S2. Such a structure also permits the side shield SAF to be magnetically coupled to S2 to provide magnetic stabilization and recovery from disturbing magnetic fields.

Figure 3A:
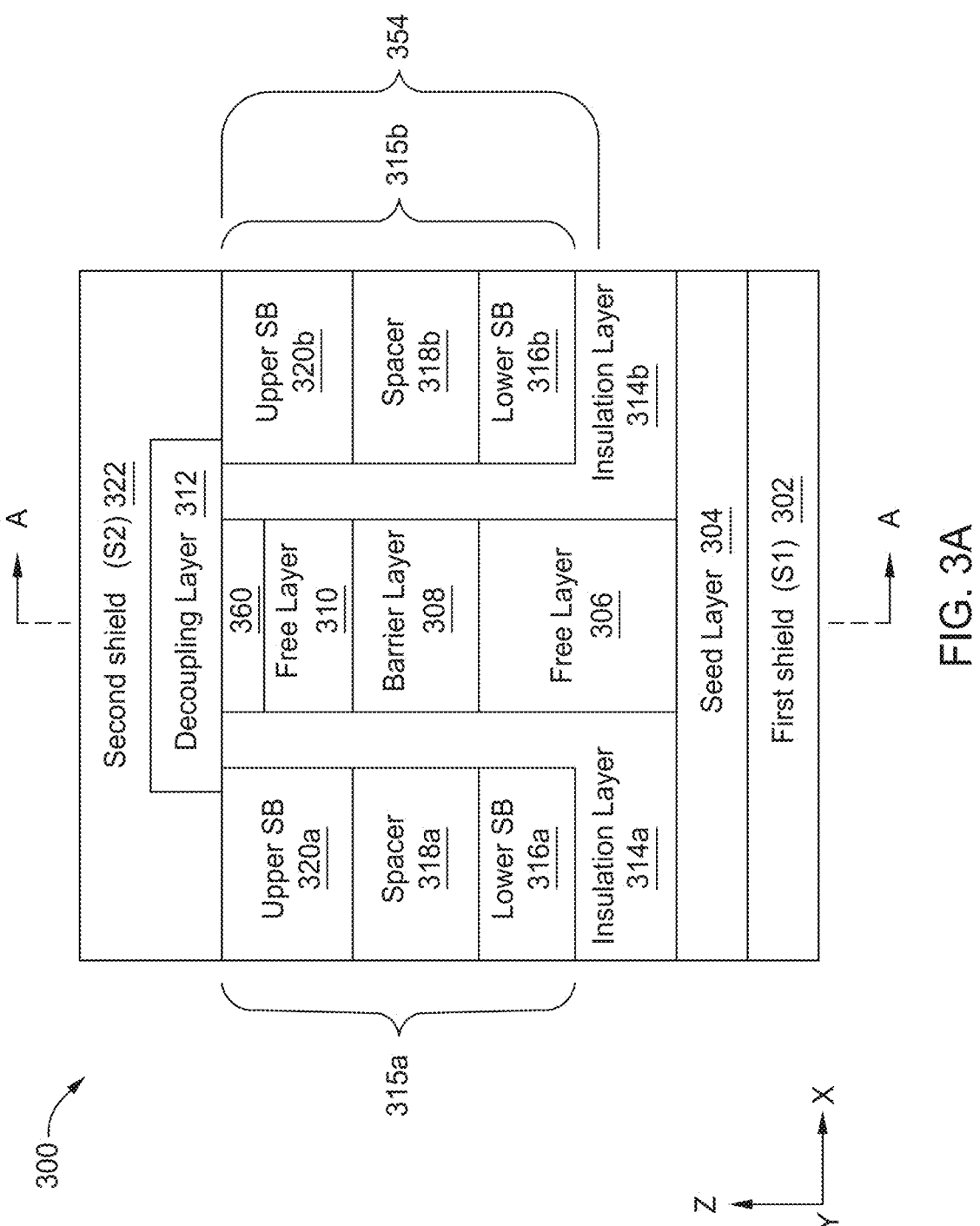
FIGS. 3A-3E illustrate a DFL read head, according to one embodiment.
Figure 3B:
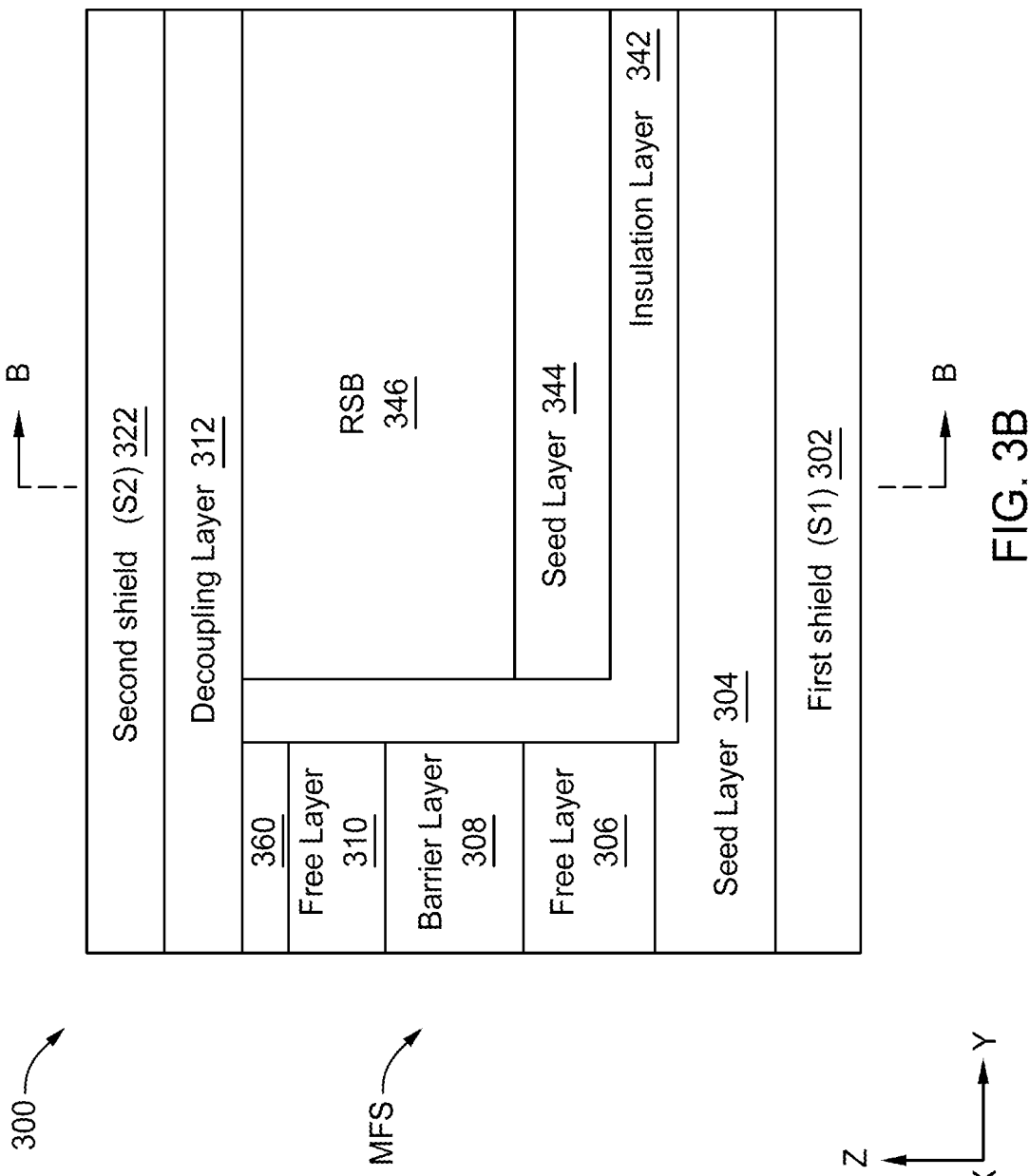
Figure 3C:
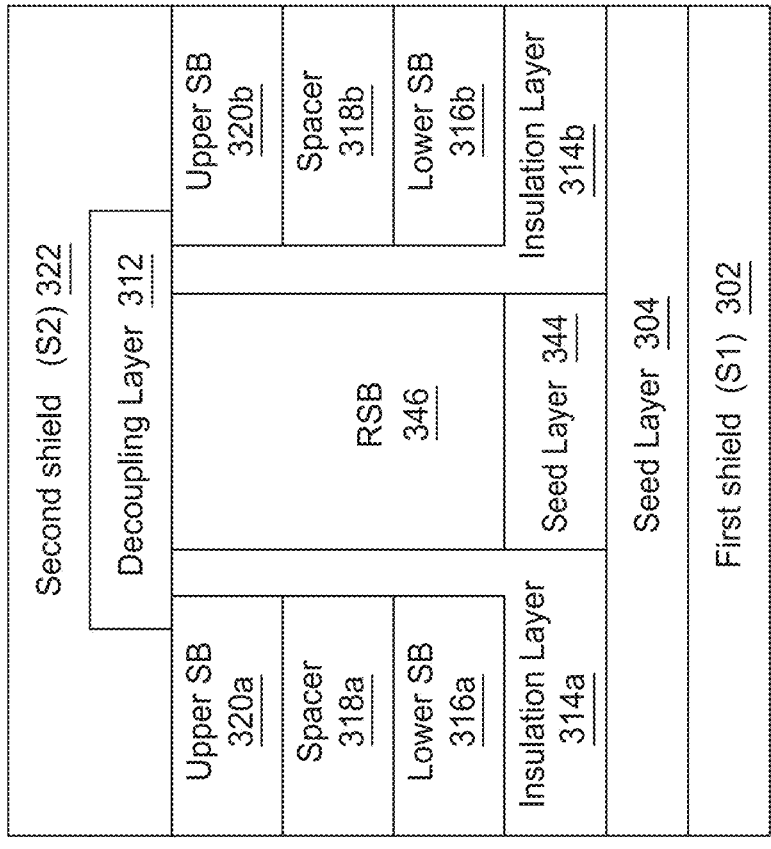
Figure 3C:
Figure 3C:
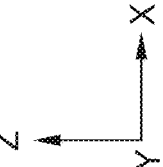
Figure 3D:
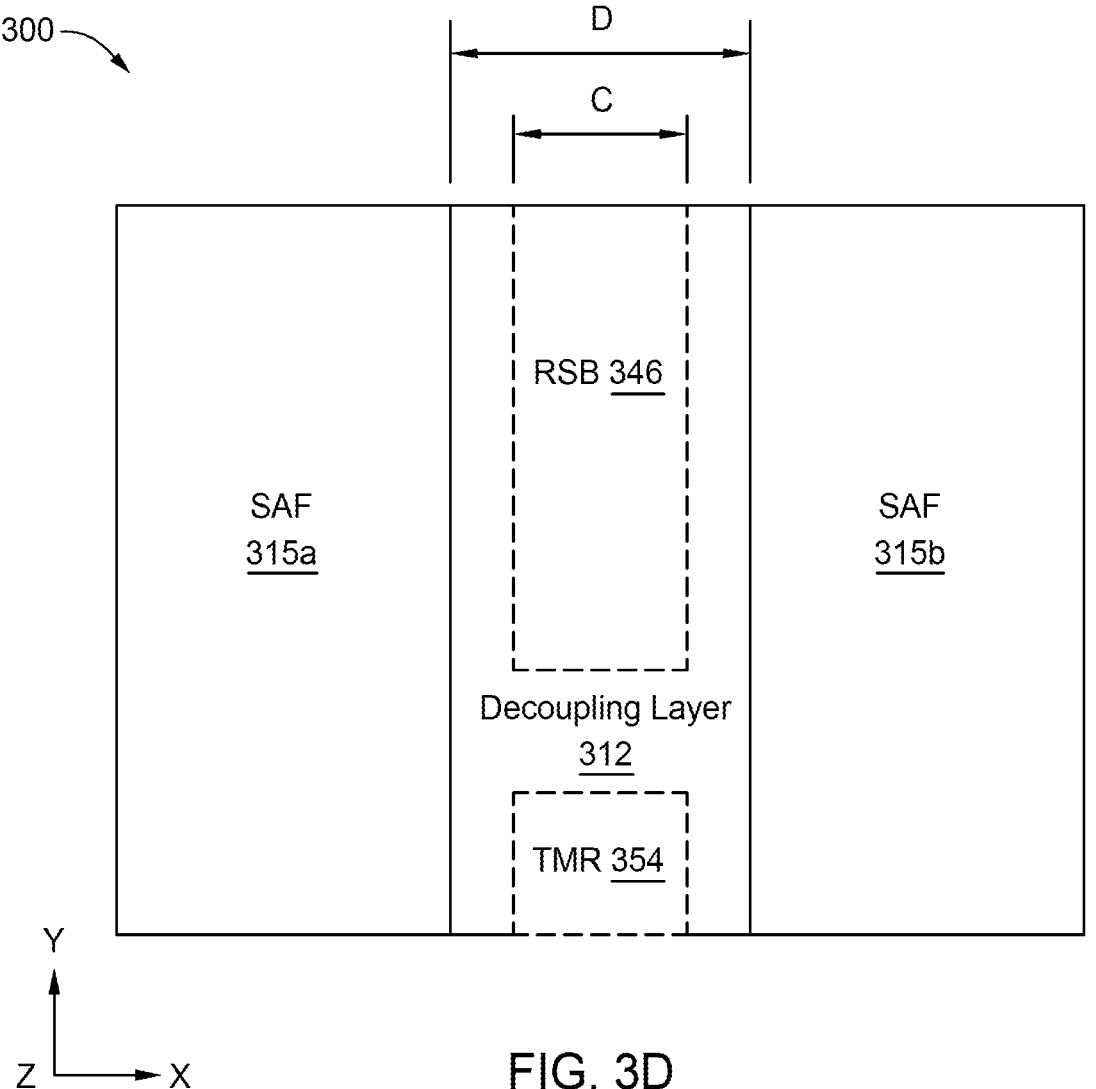
Figure 3E:
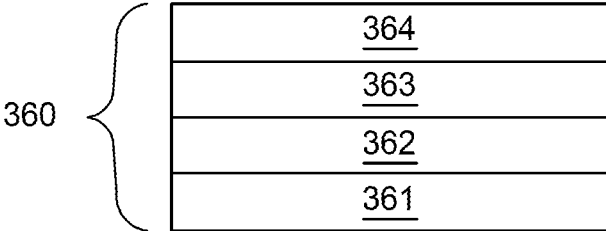

FIGS. 3A-3E illustrate a DFL read head 300, according to one embodiment. FIG. 3A illustrates an MFS view of the DFL read head 300, and FIG. 3B illustrates a cross-sectional view of the DFL read head 300 taken along line A-A of FIG. 3A. FIG. 3C illustrates a cross sectional illustration taken along line B-B of FIG. 3B. FIG. 3D is a top down view of the DFL read head 300. FIG. 3E is a schematic illustration of a TMR capping structure.

The DFL read head 300 may correspond to, or be a part of, the magnetic head assembly 121 described in FIG. 1. The DFL read head 300 may correspond to, or be a part of, the read/write head 200 described in FIG. 2, such as the magnetic read head 211. The DFL read head 300 includes a first shield (S1) 302, a seed layer 304, a first free layer (FL) 306, a barrier layer 308, a second FL 310, a decoupling layer 312, and a second shield (S2) 322. The second shield 322 may be a laminated shared shield (LSS). The seed layer 304, the first FL 306, the barrier layer 308, and the second FL 310 form a DFL read sensor of the DFL read head 300. The DFL read sensor may be a TMR sensor. The DFL read sensor has a track width in the x-direction of about 10 nm to 30 nm. The seed layer 304 includes a material selected from the group that includes tantalum (Ta), ruthenium (Ru), titanium (Ti), cobalt hafnium (CoHf), and combinations thereof. In one embodiment, the barrier layer 308 comprises magnesium oxide (MgO). The first FL 306 and the second FL 310 may each individually comprise cobalt iron (CoFe), cobalt boron (CoB), cobalt iron boron (CoFeB), cobalt hafnium (CoHf), cobalt iron hafnium (CoFeHf) and combinations thereof. The decoupling layer 312 may comprise conductive materials such as W, Ta, Ru, and combinations thereof.

The DFL read head 300 further includes a first SAF soft bias (SB) side shield 315a that includes a first lower SB layer 316a, a first spacer 318a such as ruthenium, and a first upper SB layer 320a and a second SAF SB side shield 315b that includes a second lower SB layer 316b, a second spacer 318b such as ruthenium, and a second upper SB layer 320b. The SAF SB layers 316a, 316b, 320a, 320b may comprise NiFe and/or CoFe and combinations thereof. The magnetic moments or magnetization directions for the first FL 306 and the second FL 310 may be antiparallel due to the antiparallel biasing from the SAF SB side shields 315a, 315b (collectively referred to as SAF SB side shields 315).

On top of the second FL 310 is a TMR capping structure 360. The TMR capping structure 360 may comprise a single layer or multiple layers. Suitable materials for the TMR capping structure 360 include metals and metal compounds. Example metals include Ta, Ti, Ru, W, and other non-magnetic metals. In one embodiment shown in FIG. 3E, the TMR capping structure 360 comprises a first sublayer 361 of ruthenium, a second sublayer 362 of titanium disposed on the first sublayer 361, a third sublayer 363 of ruthenium disposed on the second sublayer 362, and a fourth sublayer 364 of tantalum disposed on the third sublayer 363. In one embodiment, the TMR capping structure 360 has a thickness of between about 45 Angstroms and about 65 Angstroms such as 60 Angstroms.

The TMR sensor (also referred to as DFL sensor below) 354 is insulated from SAF SB side shields 315 by insulation layers 314a, 314b (collectively referred to as insulation layers 314). The insulation layers 314 may be aluminum oxide (AlOx), magnesium oxide (MgO) or any other suitable insulation material, and combinations thereof.

As shown in FIG. 3B, the DFL read head 300 further includes a RSB 346 and an insulation layer 342. The RSB 346 is isolated electrically by an insulation layer 342 from the DFL read sensor 354 and the first shield 302. The insulation layer 342 may be aluminum oxide (AlOx), magnesium oxide (MgO), any other suitable insulation material, and combinations thereof. A bottom portion of the RSB 346 disposed adjacent to the first shield 302 is spaced from the insulation layer 342 by a seed layer 344, where the seed layer 344 has a same width in the y-direction as the RSB 346. The RSB 346 is further insulated by insulation layer 342 from the DFL read sensor 354 (e.g., the RCB is recessed from the MFS). The RSB 346 generates a magnetic field pointing away from the insulation layer 342 and towards the following layers: the first FL 306, the barrier layer 308, and the second FL 310. The RSB 346 is magnetically decoupled from the second shield 322 by the decoupling layer 312. The RSB 346 may comprise NiFe and/or CoFe and combinations thereof. Generally, the materials of the RSB 346 or the SAF SB side shields 315 are polycrystalline. As such, the granular nature of the material of the RSB 346 determines the degree of the intrinsic non-uniformity of the transverse bias fields depending on its magneto-crystalline anisotropy.

The RSB 346 has a magnetization direction (e.g., in the y-direction) perpendicular to a magnetization direction (e.g., in the x-direction) of the first FL 306 and the second FL 310. Before the magnetic recording head comprising the DFL read head 300 is shipped from the production line, the RSB 346 typically needs to be magnetically initialized by a magnetic field in the y-direction.

FIG. 3D is a top down view of the DFL read head 300, with the second shield (S2) removed for clarity. In this view, the decoupling layer 312 is over the RSB 346 and TMR sensor 354, as they are drawn with dotted lines to show they are under the decoupling layer 312 and otherwise obscured by it in this view. As shown in FIG. 3D, the decoupling layer 312 has a width D while both the RSB 346 and the TMR sensor 354 have widths C, where D is greater than C. The tolerance in the fabrication process means that the decoupling layer may in some embodiments extend in the cross track direction beyond the track width of the TMR sensor 354, and also magnetically decouple part of the SAF side shields 315a/b from the S2. To maximize stability and coupling between the SAF side shields 315a/b and the S2 322, D should be as small as possible. Manufacturing tolerances can lead to the decoupling layer 312 having a greater width compared to both the TMR sensor 354 and the RSB 346. As an example, if the width of the TMR sensor 354 and the RSB 346 are each 20 nm, the overlay tolerance could be +/−7 nm and a critical dimension (CD) tolerance could be +/−3 nm then the width of the decoupling layer 312 would be 20+2*7+3=37 nm.

As shown in FIG. 3A, the width of the decoupling layer 312 in the x-direction is greater than the collective width of the TMR sensor 354, the insulating layer 314a, and the insulating layer 314b. Similarly, as shown in FIG. 3C (cross-sectional view at line B-B in FIG. 3B at the RSB), the width of the decoupling layer 312 is greater than the collective width of the RSB 346, the insulating layer 314a, and the insulating layer 314b. The RSB 346 is completely decoupled from S2 322 while most of the SAF side shields 315a/b is coupled to S2 322.

The DFL read head 300 is fabricated by forming the TMR sensor 354 and RSB 346 without depositing a capping layer thereover. The RSB 346 and TMR sensor 354 are patterned together to achieve a desired width that is substantially similar. A cap could theoretically be utilized to prevent oxidation or corrosion in subsequent processing prior to formation of the decoupling layer 312, but the cap would be made of an easy to remove material and be very thin. Suitable materials for the cap include Si, SiN, Ti, or TIN. The easy to remove cap would be removed prior to deposition of the decoupling layer 312. Thereafter, the side shields 315a, 315b would be formed, followed by formation of the decoupling layer 312. The decoupling layer 312 can be formed by either blanket deposition followed by material removal or by depositing a mask and pattern depositing the decoupling material into the mask opening followed by mask removal. S2 322 could then be formed to create the DFL read head 300 shown in FIGS. 3A-3E.

The advantages of using a decoupling layer 312 instead of a capping layer are that the RSB 346 is always going to be properly isolated from S2 322 while the SAF 315a,b will be coupled and stabilized by S2 322. The advantages of a partially decoupled SAF 315a,b over a fully decoupled SAF 315a,b is that the fully decoupled SAF 315a,b would not have sufficient stabilization from S2 322 while the partial decoupling provides preferential direction and is more stable. The downside of the partial decoupling is that the SAF 315a,b is not coupled to S2 322 nearest the track edge.

In one embodiment, a DFL read head comprises: dual free layer (DFL) read head, comprising: a first shield; a tunnel magneto resistance (TMR) sensor disposed at a media facing surface (MFS) and over the first shield; soft bias (SB) side shields disposed adjacent to the TMR sensor, in a cross-track direction and at the MFS, and over the first shield; a rear soft bias (RSB) disposed adjacent to the TMR sensor in a stripe height direction, and recessed from the MFS and over the first shield; a decoupling layer disposed on the TMR sensor, the RSB, and at least a portion of the SB side shields; and a second shield disposed over the decoupling layer and the SB side shields, wherein both the decoupling layer and the SB shields are in contact with the second shield. The decoupling layer comprises a non-magnetic, electrically conductive material. The decoupling layer comprises W, Ta, Ru, and combinations thereof. The TMR sensor has a first cross-track direction width at the MFS, the decoupling layer has a second cross-track direction width at the MFS, and wherein the second cross-track direction width is greater than the first cross-track direction width. The RSB has a third cross-track direction width and wherein the first cross-track direction width is substantially equal to the third cross-track direction width. The TMS sensor comprises a capping structure in contact with the decoupling layer. The RSB has a first width, the decoupling layer has a second width at the MFS, and wherein the second width is greater than the first width. A magnetic recording device comprising the DFL read head is also contemplated.

In another embodiment, a dual free layer (DFL) read head comprises: a tunnel magneto resistance (TMR) sensor disposed at a media facing surface (MFS), wherein the TMR sensor has a first cross-track direction width at the MFS; soft bias (SB) side shields disposed adjacent to the TMR sensor at the MFS; a rear soft bias (RSB) disposed adjacent to the TMR sensor and recessed from the MFS; and a decoupling layer disposed on the TMR sensor, wherein the decoupling layer has a second cross-track direction width at the MFS, wherein the second cross-track direction width is greater than the first cross-track direction width. The decoupling layer is disposed on at least a portion of the SB side shields. The DFL read head further comprises: a first shield, wherein the SB side shields are disposed over the first shield; and a second shield, wherein at least a different portion of the SB side shields are in contact with the second shield. The decoupling layer is disposed on the RSB. The RSB is spaced from the TMR sensor in the stripe height direction by an insulating material and wherein a shield disposed on the decoupling layer is spaced from the insulating material by the decoupling layer.

A magnetic recording device comprising the DFL read head is also contemplated.

In another embodiment, a dual free layer (DFL) read head comprises: a tunnel magneto resistance (TMR) sensor disposed at a media facing surface (MFS); soft bias (SB) side shields disposed adjacent to the TMR sensor in a cross-track direction at the MFS; a rear soft bias (RSB) disposed adjacent to the TMR sensor in a stripe height direction and recessed from the MFS, wherein the RSB has a first width in the cross-track direction; and a decoupling layer disposed on the RSB, wherein the decoupling layer has a second width in the cross-track direction at the MFS, wherein the second width is greater than the first width. The decoupling layer is disposed on the TMR sensor. The RSB is spaced from the SB side shields in the cross-track direction by an insulating material, wherein the insulating material has a third width in the cross-track direction, and wherein the first width plus the third width is collectively less than the second width. The DFL read head further comprises a shield, wherein the shield is in contact with the SB side shields and the decoupling layer, and wherein the insulating material is spaced from the shield by the decoupling layer. The DFL read head further comprises a shield, wherein the RSB is not pinned by the shield. A magnetic recording device comprising the DFL read head is also contemplated.

While the foregoing is directed to embodiments of the present disclosure, other and further embodiments of the disclosure may be devised without departing from the basic scope thereof, and the scope thereof is determined by the claims that follow.

What is claimed is:

1. A dual free layer (DFL) read head, comprising:
a first shield;
a tunnel magneto resistance (TMR) sensor disposed at a media facing surface (MFS) and over the first shield;
soft bias (SB) side shields disposed adjacent to the TMR sensor, in a cross-track direction and at the MFS, and over the first shield;
a rear soft bias (RSB) disposed adjacent to the TMR sensor in a stripe height direction, and recessed from the MFS and over the first shield;
a decoupling layer disposed on the TMR sensor, the RSB, and at least a portion of the SB side shields, wherein a lower surface of the decoupling layer disposed in contact with the TMR sensor and the SB side shields is co-planar with an uppermost surface of the SB side shields;
a second shield disposed over the decoupling layer and the SB side shields, wherein both the decoupling layer and the SB shields are in contact with the second shield;
a first seed layer having a greater width in the cross-track direction and a greater length in the stripe height direction than the TMR sensor;
an insulating layer disposed between the first seed layer and the RSB; and
a second seed layer disposed between the insulating layer and the RSB.

2. The DFL read head of claim 1, wherein the decoupling layer comprises a non-magnetic, electrically conductive material.

3. The DFL read head of claim 2, wherein the decoupling layer comprises W, Ta, Ru, or combinations thereof.

4. The DFL read head of claim 1, wherein the TMR sensor has a first cross-track direction width at the MFS, the decoupling layer has a second cross-track direction width at the MFS, and wherein the second cross-track direction width is greater than the first cross-track direction width.

5. The DFL read head of claim 4, wherein the RSB has a third cross-track direction width and wherein the first cross-track direction width is substantially equal to the third cross-track direction width.

6. The DFL read head of claim 1, wherein the TMR sensor comprises a capping structure in contact with the decoupling layer.

7. The DFL read head of claim 1, wherein the RSB has a first width, the decoupling layer has a second width at the MFS, and wherein the second width is greater than the first width.

8. A magnetic recording device comprising the DFL read head of claim 1.

9. A dual free layer (DFL) read head, comprising:
a tunnel magneto resistance (TMR) sensor disposed at a media facing surface (MFS), wherein the TMR sensor has a first cross-track direction width at the MFS;
soft bias (SB) side shields disposed adjacent to the TMR sensor at the MFS;
insulating material disposed between the TMR sensor and the SB side shields, wherein the TMR sensor, the SB side shields, and the insulating material have a second cross-track direction width at the MFS;
a rear soft bias (RSB) disposed adjacent to the TMR sensor and recessed from the MFS;
a decoupling layer disposed on the TMR sensor, wherein the decoupling layer has a third cross-track direction width at the MFS, wherein the third cross-track direction width is greater than the first cross-track direction width and less than the second cross-track direction width, wherein a lower surface of the decoupling layer disposed in contact with the TMR sensor and the SB side shields is co-planar with an uppermost surface of the SB side shields;
a first seed layer having a greater width in the cross-track direction and a greater length in a stripe height direction than the TMR sensor;
an insulating layer disposed between the first seed layer and the RSB; and
a second seed layer disposed between the insulating layer and the RSB.

10. The DFL read head of claim 9, wherein the decoupling layer is disposed on at least a first portion of the SB side shields.

11. The DFL read head of claim 10, further comprising:
a first shield, wherein the SB side shields are disposed over the first shield; and
a second shield, wherein at least a second portion of the SB side shields are in contact with the second shield, the first portion being different than the second portion.

12. The DFL read head of claim 9, wherein the decoupling layer is disposed on the RSB.

13. The DFL read head of claim 12, wherein the RSB is spaced from the TMR sensor in the stripe height direction by an insulating material and wherein a shield disposed on the decoupling layer is spaced from the insulating material by the decoupling layer.

14. A magnetic recording device comprising the DFL read head of claim 9.

15. A dual free layer (DFL) read head, comprising:
a tunnel magneto resistance (TMR) sensor disposed at a media facing surface (MFS);
soft bias (SB) side shields disposed adjacent to the TMR sensor in a cross-track direction at the MFS;
a rear soft bias (RSB) disposed adjacent to the TMR sensor in a stripe height direction and recessed from the MFS, wherein the RSB has a first width in the cross-track direction;
a decoupling layer disposed on the RSB, wherein the decoupling layer has a second width in the cross-track direction at the MFS, wherein the second width is greater than the first width, wherein a lower surface of the decoupling layer disposed in contact with the TMR sensor and the SB side shields is co-planar with an uppermost surface of the SB side shields;
a first seed layer having a greater width in the cross-track direction and a greater length in the stripe height direction than the TMR sensor;
an insulating layer disposed between the first seed layer and the RSB; and a second seed layer disposed between the insulating layer and the RSB.

16. The DFL read head of claim 15, wherein the TMR sensor comprises a capping structure, and wherein the decoupling layer is disposed on the capping structure of the TMR sensor.

17. The DFL read head of claim 15, wherein the RSB is spaced from the SB side shields in the cross-track direction by an insulating material, wherein the insulating material has a third width in the cross-track direction, and wherein the first width plus the third width is collectively less than the second width.

18. The DFL read head of claim 17, further comprising a shield, wherein the shield is in contact with the SB side shields and the decoupling layer, and wherein the insulating material is spaced from the shield by the decoupling layer.

19. The DFL read head of claim 15, further comprising a shield, wherein the RSB is not pinned by the shield.

20. A magnetic recording device comprising the DFL read head of claim 15.

* * * * *